United States Patent

Borsuk et al.

[15] 3,700,793

[45] Oct. 24, 1972

[54] FREQUENCY INTERLEAVED VIDEO MULTIPLEX SYSTEM

[72] Inventors: Michael Howard Borsuk, Red Bank, N.J.; Sotirios Constantine Kitsopoulos, Zurich, Switzerland

[73] Assignee: Bell Telephone Laboratories, Incorporated, Murray Hill, N.J.

[22] Filed: June 9, 1970

[21] Appl. No.: 44,711

[52] U.S. Cl............178/6.8, 178/5.2 R, 178/DIG. 23

[51] Int. Cl................................................H04n 7/08

[58] Field of Search........178/5.4 P, DIG. 3, DIG. 23, 178/5.2 R, 6.8

[56] References Cited

UNITED STATES PATENTS 1,769,920 7/1930 Gray.....................178/DIG. 3

FOREIGN PATENTS OR APPLICATIONS 1,005,696 9/1965 Great Britain..........178/5.4 P

OTHER PUBLICATIONS

" Color Television w/Particular reference to the Pal System" by G. N. Patchett 1967 pp. 146- 159

" Demodulation circuits for Pal Color Television Recr's." by W. Bruch (part 2) in Electronic Engineering 9/64 pp. 609- 610

*Primary Examiner*—Richard Murray
*Assistant Examiner*—George G. Stellar
*Attorney*—R. J. Guenther and E. W. Adams, Jr.

[57] ABSTRACT

Two video signals having substantially all their energy distributed at the same discrete line harmonics are interleaved to form a multiplexed output. One signal is processed to form a modified signal whose alternate lines are phase inverted so that its energy spectrum is displaced by one-half line frequency from the original harmonics. The modified signal and the other unprocessed signal are algebraically added to produce the multiplexed output. After transmission, the signals are separated by comb characteristic filters and inverse processing reconstructs the original signal.

3 Claims, 4 Drawing Figures

INVENTORS M.H. BORSUK
S.C. KITSOPOULOS
BY David L Hewitt
ATTORNEY

FREQUENCY INTERLEAVED VIDEO MULTIPLEX SYSTEM

BACKGROUND OF THE INVENTION

This invention relates to video transmission and, more particularly, to a method and apparatus for multiplexing two video signals by frequency interleaving their spectra.

It is well known that the spectrum of a scanned video signal consists of bundles of high energy at harmonics of the line scan frequency with almost no energy in the valleys between them. This discovery and the use of this characteristic for frequency spectra interleaving is credited to P. Mertz and F. Gray as a result of their article in the Bell System Technical Journal, Volume 13, July 1934, at page 464, entitled "A Theory of Scanning and its Relation to the Characteristics of the Transmitted Signal in Telephotography and Television."

Multiplexing is, of course, valuable in conserving channel capacity and spectra interleaving is used in many video systems, including color transmission systems where the interleaved signals contain distinct color information of a single scene. Conventionally, a subcarrier modulation technique is used to provide the precise frequencies and their harmonics required for interleaving two video signals having the same spectral distribution. U. S. Pat. No. 2,635,140, issued to R. B. Dome Apr. 14, 1953, discloses an exemplary system in which one of the signals is modulated onto a subcarrier whose frequency is specifically chosen to be an odd multiple of one-half of the line rate. This modulation procedure causes the energy spectrum of the modulated signal to be displaced by one-half the fundamental scan rate so that the energy bundles are located in the valleys of the spectrum of the other signal. The apparatus required for subcarrier modulation is complex and subject to the inherent limitations of modulators and is further complicated by the need for exceedingly high quality frequency stability.

SUMMARY OF THE INVENTION

In accordance with the present invention, frequency interleaving of the video signals is provided without subcarrier modulation. Therefore, there is no need to choose a specific subcarrier and the complexity and limitations of the modulating apparatus are avoided.

One of the signals is processed so that a modified signal is produced in which alternate lines are phase inverted. This alternately inverted signal has a modified spectrum in which the energy is distributed in the gaps of the distribution of the original signal. The modified signal is algebraically combined with the other unprocessed signal to complete the interleaving and produce the multiplexed output. Upon reception the multiplexed transmission is separated by filters having comb characteristics and inverse processing reconstructs the original signal from the modified signal.

DETAILED DESCRIPTION

A processing scheme in accordance with the present invention uses horizontal rate time information to shift the frequency spectrum of one video signal to prepare it for interleaving with another video signal. The processing produces a shifted signal in which successive portions, commonly known as raster lines, are paired and an alternate line of each pair has its polarity inverted relative to the polarity of the line as scanned. This can be seen in FIG. 2 where A represents the scan signal consisting of successive lines of duration $T_h$ and B represents the processed signal where alternate lines are phase inverted. If every other raster line is inverted so that the polarity is reversed, the spectrum is modified in two useful ways. The dc component is eliminated or fixed at some value which can result in relaxed transmission requirements at low frequency and may also reduce interference thresholds since the interfering signal will appear inverted on alternate lines and so be less visible. More significantly, the correlated energy between raster lines is also affected by alternate inversion. The new signal has a fundamental frequency of one-half the horizontal line rate because the inversion produces half wave symmetry. The line rate harmonics in the original signal therefore result in energy bundles at odd multiples of one-half the line rate, or in other words, in the valleys of the original signal. The process takes some of the energy from each bundle in the original spectrum and redistributes it among nearby bundles in the new spectrum so that the energy is shifted in the sense that the new bundles have the same shaped envelope as before, but the frequency distribution is offset by one-half the line rate. These relationships hold exactly if the picture contains only horizontal transitions. For most other pictures they hold approximately.

Figure 1:
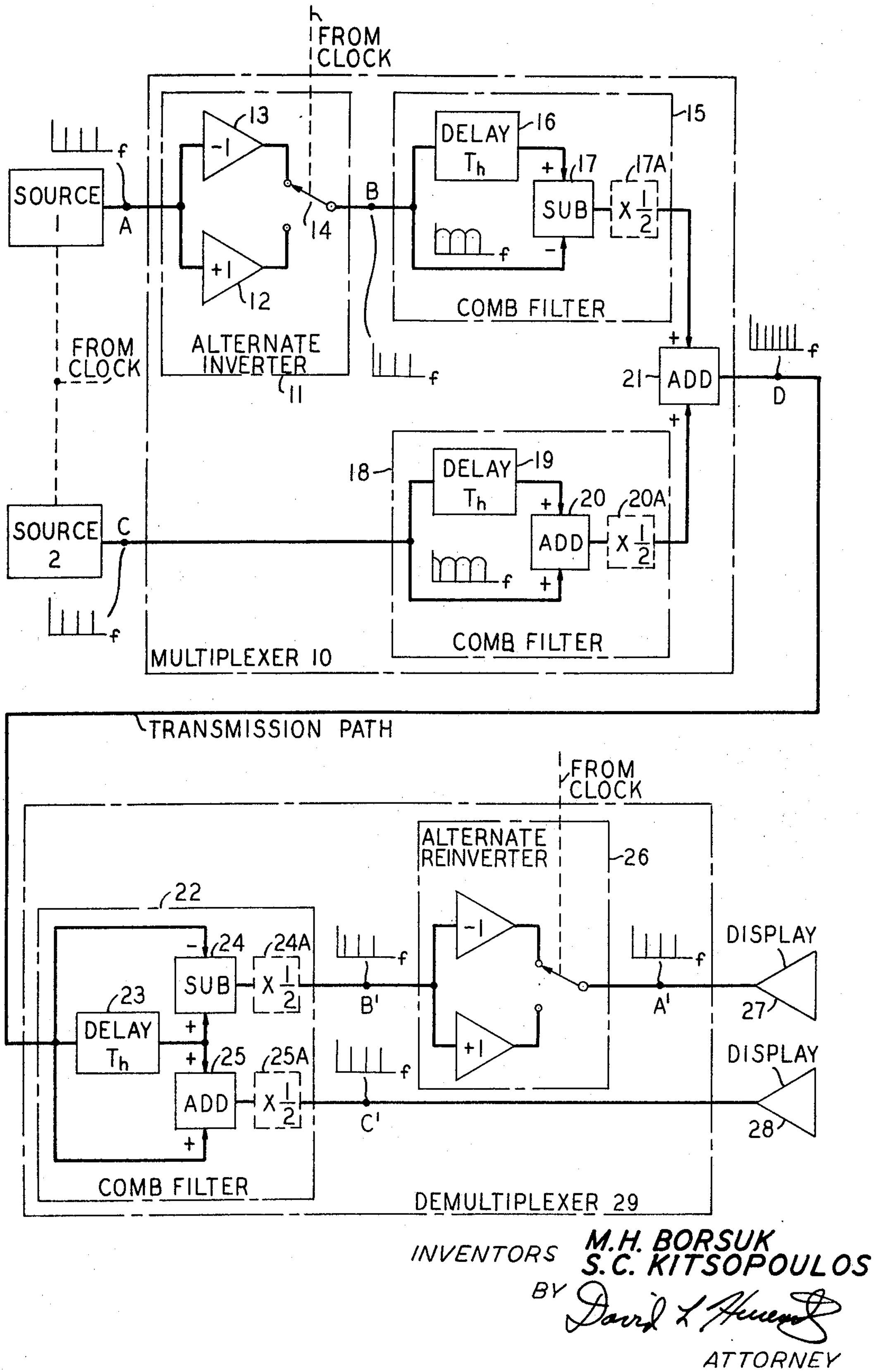
FIG. 1 is a block diagram of a transmission system in accordance with the present invention.
Figure 2:
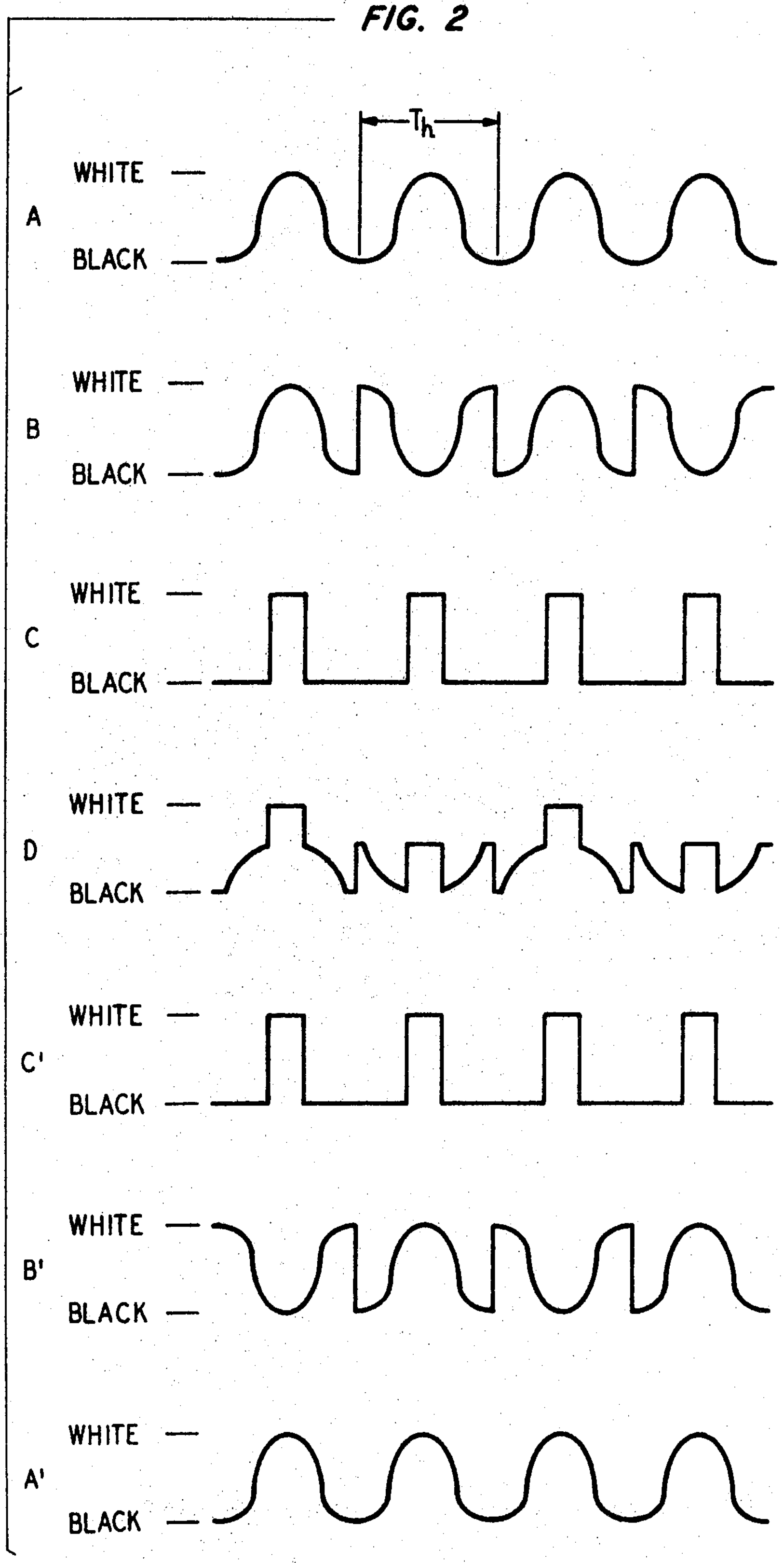
FIG. 2 is a series of waveforms illustrative of the operation of the invention.

FIG. 1 illustrates a two channel multiplex system which utilizes frequency spectra interleaving in accordance with the present invention. Two independent video signal sources, designated source 1 and source 2, respectively, provide baseband video signals synchronized to a common clock. The frequency spectra of the two signals are essentially identical, as indicated. Both signals are applied to multiplexer 10 where the video signal from source 1, represented as A in FIG. 2 undergoes alternate line inversion in circuit 11. During each horizontal sync interval, the black and white levels are reversed, producing a signal at B, as indicated in FIG. 2. This is equivalent to inverting every other line and it produces the desired spectral shift of one-half the line frequency as indicated by the spectrum diagram.

The shifted signal at B from source 1 is prefiltered by comb characteristic filter 15, which has the property of passing the shifted energy peaks at odd multiples of one-half the line frequency $f_h$; i.e., $1/2\, f_h$, $3/2\, f_h$, etc., but stopping the energy between the specified multiples. This comb filter is of conventional design consisting of delay line 16 which provides one horizontal line interval delay, and subtractor 17 which subtracts the signal from a delayed version of itself. Source 2 produces a signal represented in FIG. 2 as C, which has essentially the same spectrum as the signal at A, but may, of course, contain different picture element values. This signal is unprocessed, other than being prefiltered by another comb characteristic filter 18, which has its transmission peaks at multiples of the line frequency as distinguished from those of filter 15, which has transmission peaks at odd multiples of one-half the line frequency.

A time domain filter having a comb characteristic is a well known device especially suited to video transmission systems. The basic characteristics of these filters are described in an article by Heinz E. Kallman, entitled "Transversal Filters" published in the Proceedings of the I.R.E., July 1940 at page 302. . There are two basic comb filters whose characteristics are graphically illustrated within filters 15 and 18 of FIG. 1. The amplitude. and phase of these filters are periodic in the frequency domain with period 1/T where T is the delay of the delay element. The nulls which are due to phase cancellation between the delayed and undelayed signals are quite deep in a properly adjusted filter.

As indicated in FIG. 1, filters 15 and 18 each consist of a delay line, a combiner and possibly an attenuator. The input signal is delayed for an appropriate time by the delay line, and the delayed signal is then combined with the undelayed signal by the combiner. The delay time defines the periodicity of the comb, and in the particular application of the present invention, the delay is set to equal the horizontal scan time $T_h$. Thus, essentially each line is combined with the immediate succeeding line on an element by element basis. If the combiner is subtractive, such as is 17 in comb filter 15, the output is a series of amplitude differences, while if the combiner is additive, such as is 20 in comb filter 18, the amplitude of the output represents a series of sums of successive corresponding elements in succeeding lines. Included in each filter is an attenuator 17A and 20A serially connected to subtractor 17 and adder 20, respectively. These attenuators are optional but may be used to reduce by one-half the amplitude of the filter output, thereby normalizing the filter gain to unity in its passbands.

Each comb filter effectively combines successive pairs of lines to form an average line. The averaging of line N and N+1, , for instance, will result in a line which may be designated N+½, while lines N+1 and N+2 will be averaged to form line N+1+½. The output lines N+½ and N+1+½ inherently contain some distortion since they are combinations of two theoretically independent lines, but this minor self-distortion caused by a loss of vertical resolution is offset by the resultant comb response of the output spectrum which prevents crosstalk.

The output of the averaged signals has been shown by an appropriate Fourier analysis to have high transmission peaks at selected intervals determined by the duration of the delay. If the combiner is subtractive, these high transmission peaks will be at odd multiples of one-half the line frequency, such as is required to pass the comb-like spectrum of the signal provided at B in FIG. 1. If, on the other hand, the combiner is additive, such as in filter 18, the high transmission peaks will be at integral multiples of the line frequency and will thus pass spectrum of the signal at C in FIG. 1.

Following filters 15 and 18, the two signals are algebraically combined by adder 21. The resulting signal, which is represented as D in FIG. 2, consists of energy bundles of the two video channels interleaved to form a spectrum as shown. This signal is the multiplexed output which is applied to the transmission path as a single video output. Its bandwidth is the same as the higher of the two individual channels.

Demultiplexer 29 is functionally the inverse of the multiplexer 10. Upon reception the interleaved signals are separated by the use of receiving comb filters which are electronically the same two types as the prefilters 15 and 18. Filter 22 is a single combination filter which has the same effect as two such individual filters. Delay line 23, subtractor 24 and optional attenuator 24A constitute a filter identical to filter 15, and delay line 23 in combination with adder 25 and optional attenuator 25A constitute a circuit identical to filter 18. Composite filter 22 will separate the interleaved signals on the transmission path by passing the energy distributed at odd multiples of one-half the line frequency to point B′ and passing the energy distributed at multiples of the line frequency to point C′. The shifted signal at B′ is a substantial duplicate of the signal at B as seen by comparing B and B′ in FIG. 2 and has a corresponding spectrum. This signal is applied to alternate reinverter 26 which is identical to the multiplexing alternate inverter 11 and is synchronized to it. Synchronization may be provided by direct connection to a common clock or alternatively it may be provided by control of the stripped sync pulses of the incoming video signal. The two outputs at A′ and C′ represented in FIG. 2 are the two reconstructed video signals corresponding to A and C, respectively. These signals are applied to independent displays 27 and 28 which reproduce images corresponding to the signals produced by source 1 and source 2, respectively.

An interleaved system using a processing scheme to provide alternate inversion of the transmission of one video signal will operate without prefilters 15 and 18 and without the combination filter 22. These filters substantially prevent the crosstalk between the two interleaved signals, which would result in commercially unacceptable reproduction in systems using normal transmission techniques, but the filtering procedure does produce an increase in self-distortion as discussed above. Without the comb filters, the shifted and unprocessed signals will interact while interleaved, but since the crosstalk results between two signals which have offset spectra, the unwanted signal will be essentially invisible at the display of the desired signal. Interleaving by means of the alternate inversion process gives no preference to one signal or the other, and since each is equally shifted relative to the other, the crosstalk affects both signals similarly. The inherent problems of the multiplex system are the loss of vertical resolution and the addition of crosstalk components. Since the crosstalk is subjectively more objectionable where the two signals represent different scenes filtering to reduce crosstalk is generally preferable.

The alternate inversion processing required to provide the shifted spectrum may be provided by alternate line inversion as illustrated in FIG. 1 where alternate inverter 11 consists of a unity gain amplifier 12 and a unity gain inversion amplifier 13 which are connected to source 1 in parallel. Switch 14 clocked at the horizontal line rate alternates the signal at B between an uninverted line and an inverted line from source 1. Alternate line inversion could also be provided by numerous straightforward methods, such as the modulating circuit disclosed in U. S. Pat. No. 2,281,891, issued to V. J. Terry May 5, 1942. In any event, alternate reinverter 26 must be synchronized to and perform the same function as inverter 11.

Figure 3:
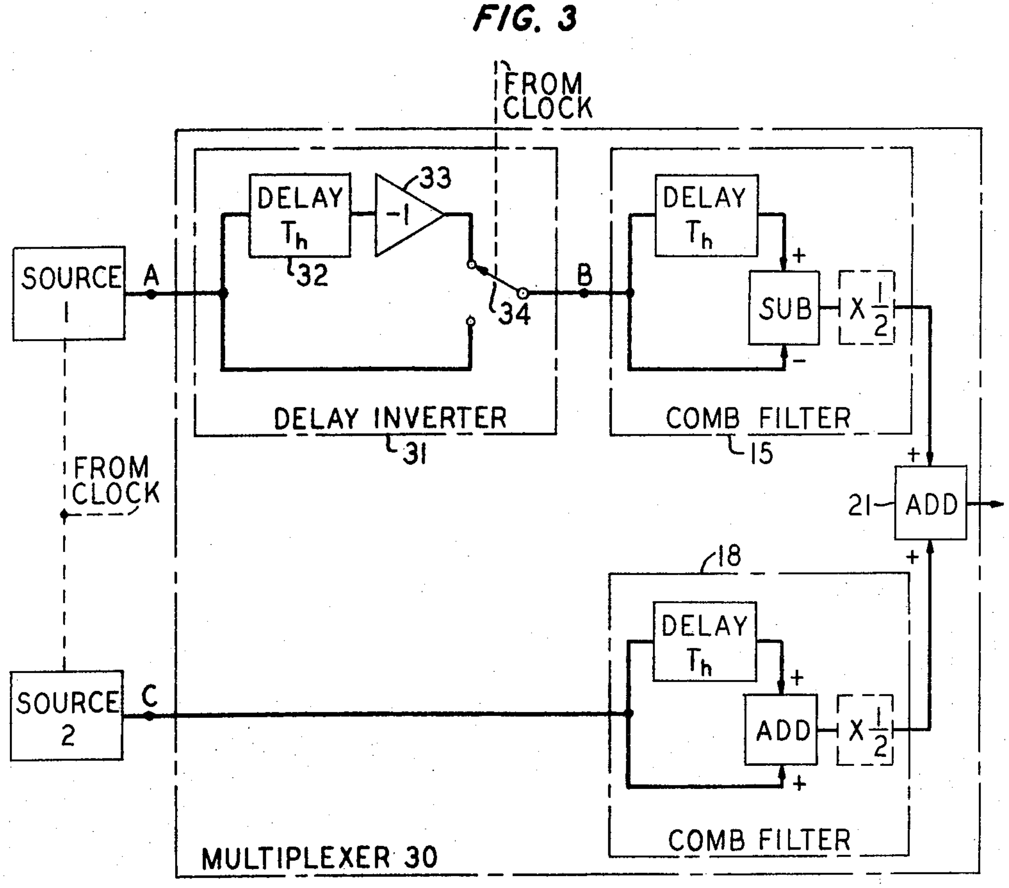
FIG. 3 is a block diagram of an alternative embodiment of the multiplexer in FIG. 1.

An alternative processing scheme is illustrated in FIG. 3 where multiplexer 30 is the same as multiplexer 10 in FIG. 1, except that alternate line inverter 11 is replaced by delay inverter 31. Switch 34 passes the signal from source 1 during one horizontal scan interval of duration $T_h$ and passes that same line delayed by delay line 32 and inverted by unity gain inversion amplifier 33 during the succeeding horizontal scan interval. As in the alternate line inversion system, the reinverter must duplicate the inverter. Such an arrangement produces more distortion but less crosstalk than the alternate line inversion technique, since there is no difference between the sets of the two successive lines of the processed signal at B.

To reconstruct perceptible movement at the display, the motion must be slower than the field rate (commonly 60 Hz in a noninterlaced system), since the movement will modulate the spectral components at the motion rate. The interleaving method of the present invention provides granularity of the spectrum at the line rate which is in the kHz range so that perturbation of motion components from the stationary spectrum is small and will have no effect upon the system's operation. A 2:1 line interlaced scanning pattern modifies the spectra by halving the field rate and adding the components of this lower field rate (30 Hz) granularity to the components of the basic frame rate of 60 Hz. Thus the interleaving scheme works equally well with the interlaced scan.

Figure 4:
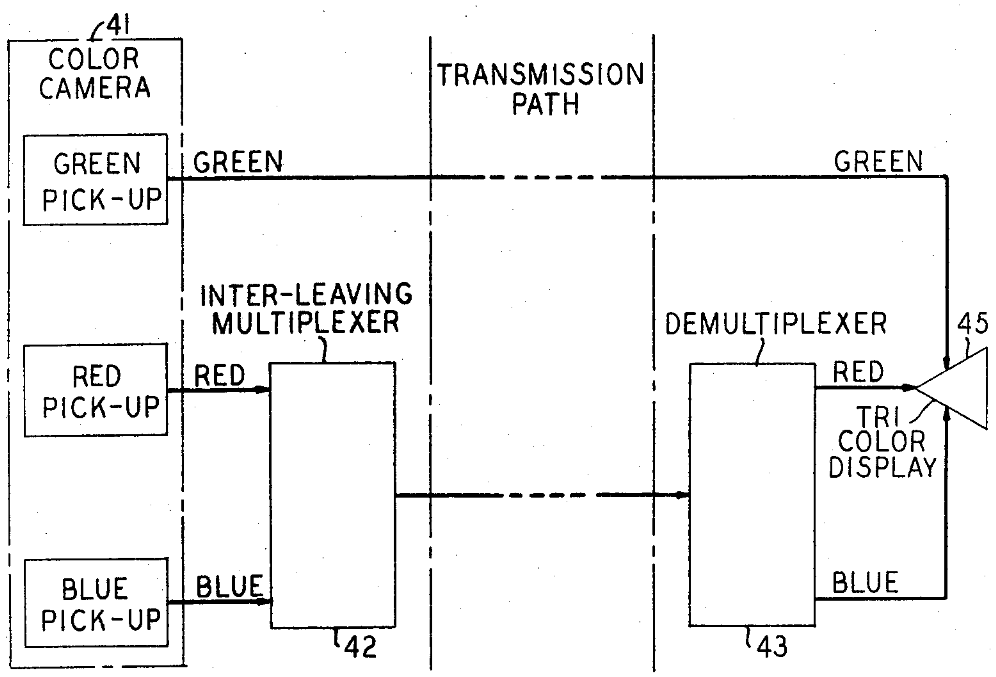
FIG. 4 is a block diagram of a color transmission system in accordance with the present invention.

FIG. 4 illustrates a color transmission system using the interleaving method of the present invention. Most color television cameras, such as 41, produce three color signals corresponding to the scene as would be passed through red, blue and green filters. Since these three signals are of the same basic picture, the transitions in all three tend to be superimposed when the scene is reconstructed in the tri-color display and as a result crosstalk is less visible than if the signals represented different scenes. Hence, filtering requirements may be reduced. In addition, it is well known that some color information can be displayed with reduced resolution without degrading the composite picture. The green signal is transmitted directly to a standard three color display 45. The red and blue signals are frequency interleaved in a multiplexer 42 which is fundamentally the same as multiplexer 10 in FIG. 1 or multiplexer 30 in FIG. 3. The interleaved output is transmitted with the green components to the receiver. Demultiplexer 43 reconstructs the red and blue signals with very slight and acceptable loss of resolution in the manner of operation of demultiplexer 29 in FIG. 1. The reconstructed red and blue signals are applied with the directly transmitted green component to tri-color display 45.

The multiplexed color system is independent of the characteristics of the transmitted signals and signals derived from the color components may be multiplexed rather than interleaving the red and blue signals directly. For instance, difference signals or other matrix outputs, such as the conventional I and Q components of the chrominance, could be multiplexed and transmitted with the luminance signal.

In all cases it is to be understood that the above-described arrangements are merely illustrative of a small number of the many possible applications of the principles of the invention. Numerous and varied other arrangements in accordance with these principles may readily be devised by those skilled in the art without departing from the spirit and scope of the invention.

What is claimed is:

1. A multiplex transmission system having first and second independent synchronized video input signals consisting of a series of portions, each portion being representative of a line of an image, and the video input signals having spectra consisting of energy distributed substantially within a common frequency range at common frequency harmonics, comprising:

means for processing the first video input signal to produce a processed signal having alternate portions phase inverted, said first video signal remaining within the common frequency range during the processing, the processed signal having a spectrum consisting of energy distributed substantially within the common frequency range at frequency harmonics displaced midway between the common frequency harmonics;

a summing means for algebraically combining signals applied to its inputs to form a multiplexed output signal;

a first comb characteristic filter for applying the processed signal to one input of said summing means;

a second comb characteristic filter for applying the second video input signal to the other input of said summing means, said summing means producing a multiplexed signal at its output having the frequency spectrum of the processed signal interleaved in the common frequency range with the frequency spectrum of the second video input;

means for transmitting the multiplexed signal;

means for separating the multiplexed signal after transmission with a combination comb filter into two signals according to their respective frequency spectra, the two signals being substantial duplicates of the processed signal and the second video input signal; and means for phase inverting alternate segments of the duplicate of the processed signal to produce a substantial duplicate of the first video input signal.

2. A system as claimed in claim 1 wherein said means for processing said first video input signal comprises:

delaying means for delaying the first video input signal for a period substantially equal to the period of one portion of the first video input signal and producing a delayed first video input signal;

an inverting means for producing a delayed phase inverted version of the first video input signal from the delayed first video input signal; and switching means for alternately selecting portions of the delayed phase inverted version of the first video input signal and the first video input signal itself.

3. A multiplexer comprising:

sources of two independent synchronized video inputs of the type consisting of a series of portions each representative of a line of an image, each input having a spectrum consisting of energy distributed substantially within a common frequency range at common frequency harmonics;

means for processing one of said two inputs to produce a processed signal having alternate portions, each representative of a line of an image, phase inverted so that its spectrum is modified and its energy is distributed substantially within said common frequency range about the midpoints of the gaps between said common frequency harmonics, the signals remaining within said common frequency range during processing; and means for combining said processed signal and the other of said two inputs to form a multiplexed output substantially within the common frequency range and having the frequency spectrum of said other input, said means for combining comprising a summing means and two comb characteristic filters for connecting the processed and unprocessed signals to the input of the summing means.

* * * * *